United States Patent [19]
Hopfe

[11] 4,335,576
[45] Jun. 22, 1982

[54] WAVE ENERGY DESALINIZATION

[76] Inventor: Harold H. Hopfe, 65 Pioneer Dr., Longmeadow, Mass. 01106

[21] Appl. No.: 109,876

[22] Filed: Jan. 7, 1980

Related U.S. Application Data

[63] Continuation-in-part of Ser. No. 832,610, Oct. 6, 1977, abandoned, Ser. No. 935,586, Aug. 21, 1978, abandoned, Ser. No. 943,286, Sep. 18, 1978, abandoned, and Ser. No. 3,744, Jan. 15, 1979, Pat. No. 4,204,406.

[51] Int. Cl.³ .............................................. F03B 13/12
[52] U.S. Cl. ..................................... 60/398; 60/497; 203/10; 203/DIG. 20; 159/DIG. 27; 417/331
[58] Field of Search .......................... 60/398, 497-507; 159/DIG. 27; 417/330, 331; 203/10, DIG. 20; 290/53

[56] References Cited
U.S. PATENT DOCUMENTS

3,455,792 7/1969 Ohta ........................ 159/DIG. 27
3,580,814 5/1971 Green ............................. 203/10 X Primary Examiner—Allen M. Ostrager

[57] ABSTRACT

A device for producing fresh water from salt sea water by utilizing the hydrodynamic energy of waves, comprising a buoyant platform; means for mooring the platform; a pump connected to the mooring means; a reservoir for pressurized sea water; a desalination system for extracting fresh water from the sea water; hydraulic flow control means for causing the pump to pump sea water into the sea water reservoir, as motion of the buoyant platform is produced due to the passing of waves beneath it; measuring means for measuring parameters of the sea adjacent the buoyant platform; and a control device connected to control the pressure in the sea water reservoir and the flow of sea water from the reservoir through the desalination system in response to the parameters of the sea.

20 Claims, 9 Drawing Figures

WAVE ENERGY DESALINIZATION

RELATED APPLICATIONS

This application is a continuation-in-part of my applications Ser. No. 832,610, filed Oct. 6, 1977; Ser. No. 935,586, filed Aug. 21, 1978; and Ser. No. 943,286, filed Sept. 18, 1978, all now abandoned; and Ser. No. 003,744, filed Jan. 15, 1979, now U.S. Pat. No. 4,204,406. Its invention relates to devices for producing fresh water from salt sea water by utilizing the hydrodynamic energy of waves.

SUMMARY OF THE INVENTION

According to the present invention there is provided a device for producing fresh water from salt sea water by utilizing the hydrodynamic energy of waves, comprising: a buoyant platform; mooring means for mooring the platform at sea; pump means mounted on the platform and connected to the mooring means; a reservoir for containing pressurized sea water connected to the pump means; a desalination system for extracting fresh water from the sea water connected to the reservoir means; hydraulic flow control means for causing the pump means to pump sea water into the sea water reservoir, as motion of the buoyant platform is produced due to the passing of waves beneath it; measuring means for measuring parameters of the sea adjacent the buoyant platform; and a control device connected to control the pressure in the sea water reservoir and flow of sea water from the reservoir through the desalination system in dependence upon the parameters of the sea as determined by the measuring means.

Preferably the platform has a length and width of at least 30 meters. The platform may have a vertical mode natural frequency due to the buoyancy of the water of 0.5 Hz.

A hydraulic motor may be connected to the sea water reservoir and pressurized water be allowed to flow through the motor to produce rotary power which may be utilized to drive an electrical generator, with the control device being used to determine the relative quantities of fresh water and electricity that are produced.

The pump may be of the piston and cylinder type, with the piston being connected to the mooring means.

A gas spring may be employed as a means of temporarily storing energy for driving the pump means.

The motor means may alternatively be connected to drive any piece of rotating machinery, such as the pumping means of a reverse osmosis desalination system which produces fresh water from sea water.

In the preferred embodiment the pump means comprises a plurality of pistons-and-cylinders, the pistons of which are connected to the mooring means. The device may include hydrostatic bearing means acting between each cylinder and its respective piston.

The device may include a polymeric coating on the interior of each cylinder and on the respective piston. The polymeric coating may include a matrix of a corrosion-resistant metal.

The device may include a flexible linkage between each piston and a piston shaft connected to the mooring means.

In one embodiment, the mooring means includes an anchor plate having means to reduce or prevent horizontal movement thereof on the sea bed. Thus, the mooring means may comprise a plurality of symmetrically arranged mooring lines, the lines being closer together on the anchor plate than on the platform.

The device may include piles for locating the anchor plate on the sea bed.

Additionally or alternatively, there may be a concentration of mass around the periphery of the anchor plate.

The device may include an upstanding wall around the anchor plate for containing ballast placed on the anchor plate.

The platform may be hollow in which case it may be filled with a buoyant material.

The platform may be submerged by intentional sea water flooding as a violent storm survival means.

The control device may be a minicomputer or microprocessor.

BRIEF DESCRIPTION OF THE DRAWINGS

The invention is illustrated, merely by way of example, in the accompanying drawings, in which.

DETAILED DESCRIPTION OF THE INVENTION

A device according to my earlier U.S. Pat. No. 4,204,406 for extracting hydrodynamic energy from waves comprises a floating platform 1 of buoyant construction having a rigid top surface. A plurality of anchor or mooring lines 2 pass over respective guide pulleys 3 on the platform 1 and each is connected to the end of a shaft of a respective hydraulic piston located in a hydraulic cylinder 4 which is securely fastened to the platform 1.

Figure 1:
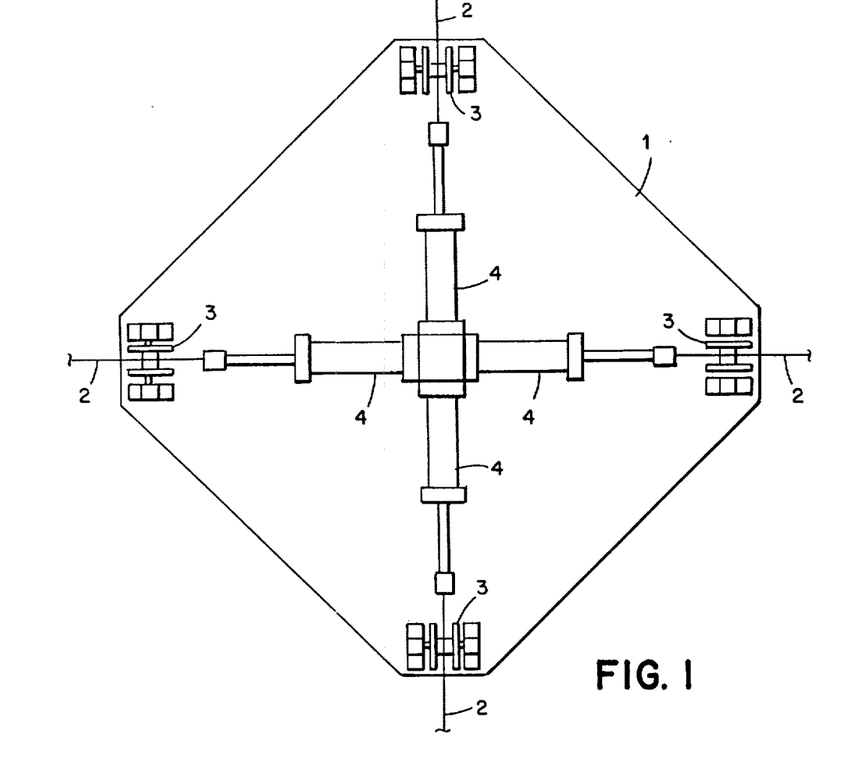
FIG. 1 is a plan view of a device for extracting hydrodynamic energy from waves.

When employed in continental shelf waters in a reasonably vigorous wave climate, typical overall dimensions of the platform 1 may be 30 meters in length and width by 1.5 meters high with a vertical mode natural frequency due to buoyancy of the water of 0.5 Hz. The edges of the platform 1 preferably are rounded to reduce wave reflection. Numerous variations of the specific shape illustrated in FIG. 1 are possible. However, shapes such as regular polygons having more than three sides and truncated vertices, or a circular shape are preferred when the direction of wave propagation is variable, so as to reduce tendencies toward rotation of the platform about its vertical axis of symmetry, due to asymmetrical wave action. The closer the approximation to a circular shape, the less will be the tendency to rotate. The platform 1 can be of a hollow, relatively thin, steel plate construction with internal stiffening members and reinforcing structures (not shown) as necessary to provide sufficient support for the various elements to be mounted on the platform and to provide adequate flexural strength for the platform 1 itself. To protect the platform from corrosion, the exposed outer surfaces are preferably covered with a non-corroding coating of, for example, polymeric material. The interior of the platform 1 may be filled with a buoyant flotation material to prevent flooding in the case of accidental rupture of the outer surface. A closed cell polymeric foam material is quite suitable for this purpose. By generating the foam within the platform 1 so as to fill tightly all the free space, the flexural strength of the platform 1 can be significantly enhanced.

The platform 1 can also be fitted with any number of sealed compartments (not shown) which can either be filled with air to provide flotation means as with the previously described polymeric foam, or can be filled with sea water so as to cause the platform 1 to submerge and rest on the sea bed as a means of avoiding structural damage during severe storm conditions. Such sealed compartments can also be partially flooded with sea water to any desired degree, as a means of adjusting the natural frequencies for periodic motion of the platform 1.

An alternative to mounting the various elements of the present invention on the top surface of the platform 1 as shown in FIG. 1 is to mount them within the platform 1 and provide the platform with suitable ports and closures to allow proper operation, and to facilitate maintenance.

The mooring lines 2 may be steel chains and/or cables or any other material having comparable flexibility, tensile strength and extensional modulus. Particularly suitable for the mooring lines 2 is cabling of polymer bonded oriented alloy steel filaments, since this has superior wear and corrosion resistance.

Figure 2:
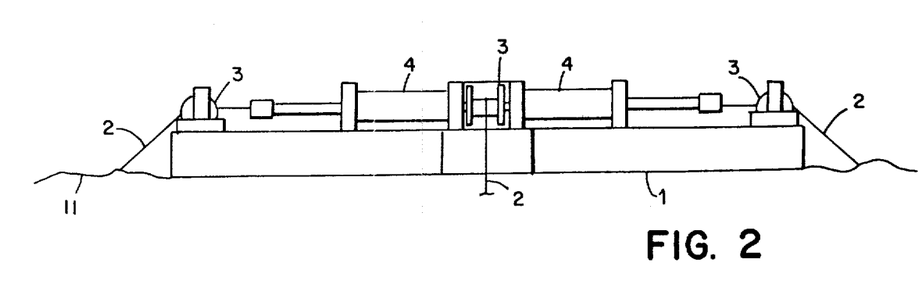
FIG. 2 is an elevational view of the device of FIG. 1.
Figure 3:
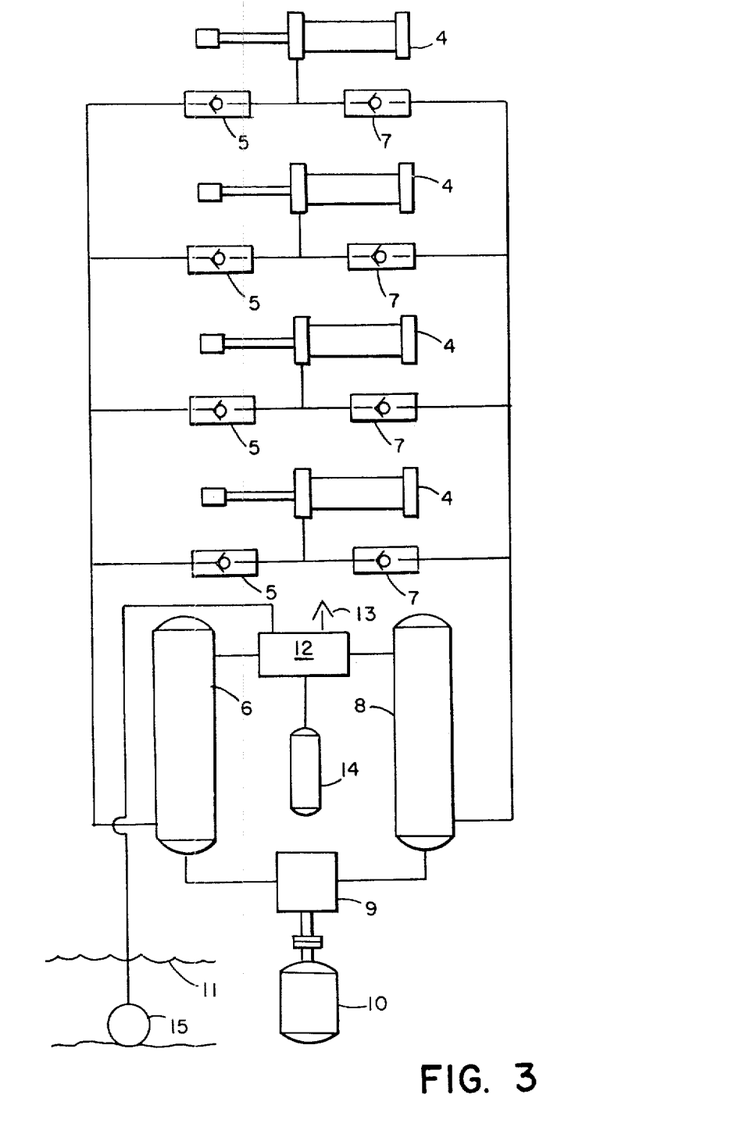
FIG. 3 is a schematic diagram of a hydraulic energy conversion system of the device of FIG. 1.

While FIGS. 1 and 2 show the hydraulic cylinders 4 in a horizontal attitude, a vertical attitude is also possible, and eliminates the need for the guide pulleys 3. However, a gimballed support system may be necessary if the cylinders 4 are in the vertical attitude to reduce or prevent large bending moments on the shafts of the pistons during operation. Flexible fluid line connections to the hydraulic cylinders 4 are then necessary. In the case of vertically mounted hydraulic cylinders 4, extra long shafts of the pistons can be used in place of the mooring lines 2. While FIGS. 1 to 3 illustrate a device having four hydraulic cylinders, any number of cylinders could be used. Each piston-and-hydraulic cylinder is employed as a piston pump, but could be replaced by a rotary pump and windlass arrangement.

As shown in FIG. 3, each cylinder 4 is in communication with a hydraulic check valve 5 which permits hydraulic fluid from an air cushioned low pressure reservoir 6 to flow into the respective hydraulic cylinder 4. A hydraulic check valve 7, connected to each cylinder 4, permits hydraulic fluid to flow from the respective hydraulic cylinder to an air cushioned high pressure reservoir 8. A hydraulic motor or turbine 9 is hydraulically connected between the two reservoirs 6, 8 and mechanically coupled to an electrical generator 10. The electricity produced can then be used to power a sea water desalination machine.

In order to keep down the size and number of hydraulic cylinders needed, a relatively high fluid pressure is desirable. For example, the high pressure fluid reservoir 8 may operate around 70 kg/cm$^2$ and generator 10 may be a one megawatt electric generator, six hydraulic cylinders 4 each having a cylinder bore of the order of 0.5 m. being required. A device with an output greater than one megawatt capacity is not expected to be functionally or economically attractive, and operating fluid pressures greater than 105 kg/cm$^2$ are not anticipated.

While FIG. 3 shows one high pressure reservoir 8 and one low pressure reservoir 6, which are shared by four hydraulic cylinders 4, any number of such reservoirs can be employed, connected either in series or in parallel.

An intelligent pressure controller 12 regulates the pressure of the air cushion in the reservoirs 6, 8 depending upon information received from a sea condition monitor 15. the controller 12 obtains air from a high pressure source 14 and releases excess air through a vent 13.

A suitable alternative method for maintaining optimum pressures in the high pressure reservoir 8 and the low pressure reservoir 6 is to adjust the quantity of hydraulic fluid in each instead of the quantity of air. This alternative is particularly attractive in the case where the hydraulic fluid is sea water and significant leakage flows exist, since a source of high pressure makeup fluid is easily provided by means of a small auxiliary pump arranged to take water directly from the sea. However, filtering of the sea water is necessary to avoid fouling.

The sea condition monitor 15 can be any variety of continuous transmitting water level gauges such as bottom pressure sensing transducers, surface penetrating capacitance probes, wave riders, etc. A typical sea condition monitor is described in U.S. Pat. No. 3,899,668. While each device according to the present invention can have its own sea condition monitor 15, one such monitor could be shared between several devices which are all located in the same general sea location.

The intelligent pressure controller 12 receives a continuous signal from the sea condition monitor 15, the signal being proportional to the instantaneous water level in the vicinity of the monitor. This signal can be processed to determine such information as mean water depth, mean wave height, mean wave period and mean wave length as well as wave height, period and length statistical spectra. A control algorithm can then use such wave condition information to calculate the optimum hydraulic fluid pressures needed in the two reservoirs 6, 8 for maximum power conversion efficiency. The calculated optimum pressure then becomes the set point for a conventional closed loop pressure control system. To handle such a control algorithm, a minicomputer or microprocessor is preferred.

The control criteria for controlling the pressure in the reservoir 8 for maximum power conversion efficiency is disclosed in the publication entitled "Papers Presented at the International Symposium on Wave and Tidal Energy, Sept. 27th-29th, 1978". Vol. 2, Paper S1.

While the controller 12 could be used to make rapid adjustments to the operating pressures of the hydraulic fluid, it is considered more practical only to employ it as a means of adjusting for the relatively slow changes that may occur in the sea condition over time periods of the order of 1 to 2 hours. There are a number of suitable means for transmitting the signal from the sea condition monitor 15 to the controller 12, for example, direct electrical cabling and AM or FM radio wave transmission.

The valves 5, 7, the reservoir 6, 8, the motor 9, the generator 10, the controller 12, the high pressure source 14 and the sea condition monitor 15 can be located on platform 1 and can be dedicated to a single device or can be remotely located to service any number of devices.

Figure 5:
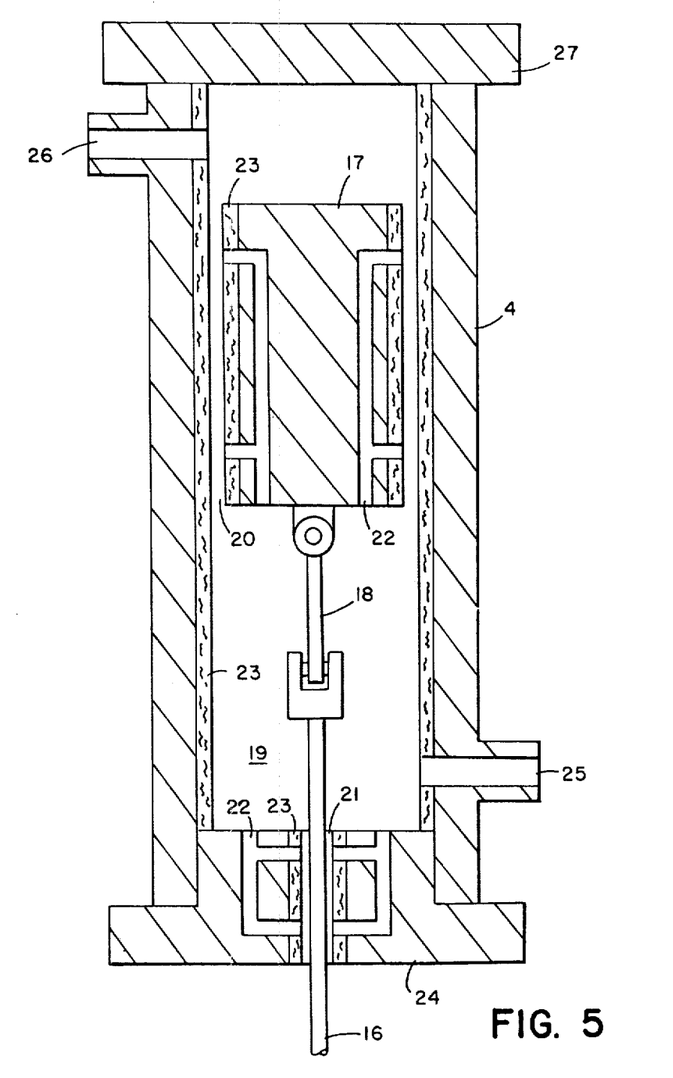
FIG. 5 is a section of a hydraulic piston-and-cylinder of the device of FIG. 1.

Referring to FIG. 5, there is illustrated a preferred form of hydraulic piston-and-cylinder having an extremely long maintenance free life. A hydraulic cylinder shaft 16 is mechanically coupled to a piston 17 by means of a flexible link 18. The flexible link 18 can be used because, in operation, it will always be in tension. The flexible link may be a mechanical universal joint, a wire rope or metal chain. A flexible link of rubbery material is less desirable since rubbery material tends to introduce a greater degree of unnecessary axial elasticity. If a wire rope cable is employed as a flexible link, it can be provided with a smooth polymeric coating and extended to take the place of the shaft 16.

A pressurized working fluid space 19 is located at the end of the hydraulic cylinder 4 through which the shaft 16 passes. The working fluid in this case is well-filtered sea water, since uncollected leakage flows will be non-polluting to the sea environment. However, any other incompressible fluid could be used if adequate means for collecting leakage flows is provided.

A small annular space 20 is provided between the piston 17 and the internal surfaces of the hydraulic cylinder 4. A small annular space 21 is provided between the shaft 16 and the cylinder 4. Fluid distribution channels 24 in the piston 17 allow a small leakage flow of working fluid, which is radially directed into the spaces 20, 21. By providing a series of three or more channels 24, which are symmetrically arranged about the longitudinal axis of the piston 17, and allowing radial discharge of fluid from at least two well-separated points along each channel, a hydrostatic bearing is formed within the spaces 20, 21 to maintain mutual concentricity and axial alignment of the piston 17 in the cylinder 4 without direct physical contact.

A thin protective coating 23 of polymeric material is applied to the surfaces of the piston 17, the inner wall of the cylinder 4 and a shaft guide 24. The main purpose of the coating is to protect these surfaces from corrosion by the working fluid. The coating can be applied to the shaft 16 as well as on any other surfaces that need such protection. Since the various components to which the coating is applied may undergo a significant amount of flexing during normal operation, a structurally compliant coating material is desirable. Various known polymeric substances are excellent materials for such an application, Dupont TEFLON (Trademark) in particular probably being the best due to its extremely inert characteristics and exceptional anti-fouling properties.

Since thin coatings of polymeric material can be mechanically fragile and lacking in dimensional stability, it may be desirable physically to combine the polymeric material with relatively corrosion-resistant metal. There are commercial processes for producing such polymeric/metal composite coatings. An example is a TEFLON/nickel alloy composite called NEDOX (Trademark). Such a coating is an excellent alternative to a pure polymeric material. However, the specific polymer and metal used depends upon the choice of working fluid. When sea water is the working fluid, a combination of TEFLON and tin is preferred. Corrosion rates for tin in sea water are of the order of only $1.25 \times 10^4$ cm per year. Another possibility is TEFLON and a special nickel/chromium alloy containing small quantities of molybdenum and niobium which is used in underwater bearing applications in the off-shore oil industry. In fact, this alloy itself can be used as the coating 23.

A port 25 is located in the hydraulic cylinder 4 near the shaft 16 to permit flow of working fluid into and out of the hydraulic cylinder as the piston 17 travels back and forth along the longitudinal axis. A port 26 is located near the opposite end of the hydraulic cylinder 4 to allow the discharge of leakage fluid from the annular space 20. If desirable, the leakage flow from the annular space 22 and the port 26 can be collected, and the collected leakage flows combined and returned to the low pressure fluid reservoir 6, by means of a small auxiliary pump. The hydraulic cylinder 4 is closed by a plate 27.

Figure 6:
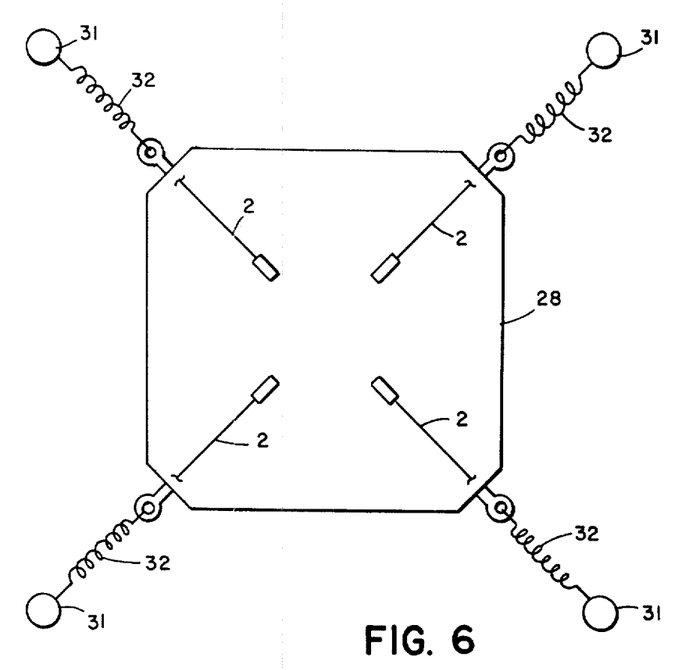
FIG. 6 is a plan view of a mooring system of the device of FIG. 1.
Figure 7:
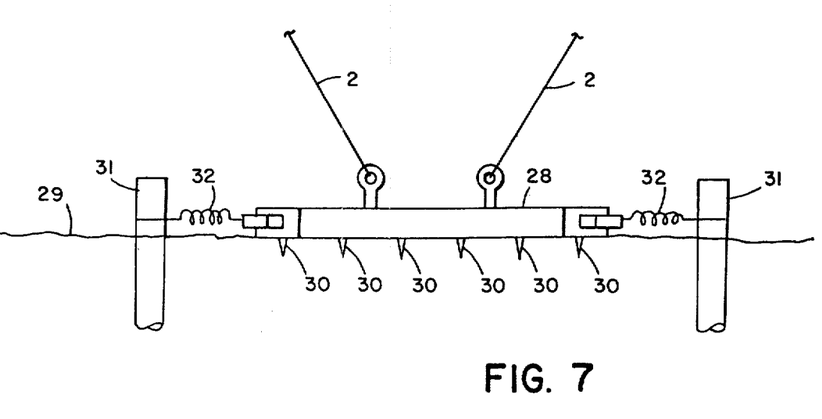
FIG. 7 is an elevational view of the mooring system of FIG. 6.

The device described above requires a mooring system, not only to maintain a desired physical location at sea, but also to allow proper functioning of the device. A number of anchoring means can be considered, such as conventional ship anchors, massive deadweight anchors, piles driven into the sea bed, augers screwed into the sea bed etc. Most of these methods work best when the mooring forces have a relatively small vertical component. However, a device according to the present invention requires a large vertical mooring force for its proper functioning. Therefore, a modified reaction plate system is preferred, as shown in FIGS. 6 and 7.

A flat horizontal reaction plate 28 rests on the sea bed 29 and has a top surface geometry which is similar to, but slightly larger than, the bottom surface geometry of the platform 1. With such an arrangement, the same hydrodynamic action that produces lifting forces on the bottom surface of the floating platform 1 also produce downward acting reaction forces of a comparable magnitude which result in a natural means of holding the reaction plate 28 in place. The reaction plate 28 is made slightly larger than the floating platform 1 to allow for some degree of horizontal offset as well as for other edge effects on performance. The reaction plate 28 is preferably constructed from non-buoyant materials such as steel or steel-reinforced concrete, so as to realise a degree of supplementary securing force due to the effective weight of the plate itself. In fact, the weight of the plate can be chosen so as to compensate entirely for any inefficiencies in the reaction plate system.

A plurality of cleats 30 are securely attached to the bottom surface of the reaction plate 28 and pressed into the sea bed, as indicated by reference numeral 29, by the weight of the reaction plate 28. The purpose of the cleats 30 is to discourage sliding of the reaction plate over the sea bed 29 due to unbalanced horizontal force components which act on the reaction plate 28 during operation of the device. The cleats 30 may have a number of shapes and they are preferably constructed from non-corroding metal, such as stainless steel, or MONEL (Trademark), but can also be constructed from carbon steel or other materials, and provided with a corrosion-resistant coating.

The action of waves passing over reaction plate 28 produces a downward acting force field which travels over the top surface of the reaction plate 28. At the same time, a corresponding force field of comparable magnitude and phase passes under the bottom surface of the floating platform 1. However, the reaction forces in the mooring lines 2 are acting only at fixed locations on the surface of reaction plate 28. Consequently, moments are produced as a wave passes, which tend to first rotate the reaction plate 29 about one edge and then about the opposite edge. The magnitude of this effect can be reduced by arranging the mooring lines 2 so that under quiescent conditions, they are mutually upwards divergent in a symmetrical pattern, as illustrated in FIGS. 6 and 7.

Another means of reducing the tendency toward rotation of the reaction plate 28 about its edges is to distribute the excess mass of the reaction plate 28 such that it is concentrated at the edges. The concentrated weight can be in the form of a vertical peripheral wall which then provides a means of additional position stability because of the inertia of the water contained within the wall. Also, the contained water is easily replaceable with sand or other high density debris as an inexpensive means of increasing the weight of the reaction plate.

A plurality of piles 31 or similar devices having good horizontal stability are located about the perimeter of the reaction plate 28 in a symmetrical pattern. A plurality of elastic connectors 32 physically join the piles 31 to the reaction plate 28. The purpose of the elastic connectors 32 is to provide a repositioning effect in the event that the reaction plate 28 is significantly displaced, as may occur under violent sea conditions. The elastic connectors 32 can be simple coil springs as illustrated in FIGS. 6 and 7, or any of several alternative means, such as elastomeric rope, pneumatic springs etc. While a reaction plate 28 resting on the sea bed 29 is preferred, it can also be employed at any intermediate elevation between the sea bed 29 and the floating platform 1.

In situations where strong ocean currents exist, a conventional three-point auxiliary mooring system (not shown) can be used to prevent drifting of the platform 1, without impeding the normal functioning of the device. This result is achieved by employing relatively long auxiliary mooring lines of the order of ten times the water depth, each having one end secured to the center of the bottom surface of the floating platform 1, while the other end is joined to an anchoring means on the sea bed 29, the three auxiliary mooring lines being arranged in a symmetrical array relative to the center of the floating platform 1. With such an arrangement, vertical force components acting on the floating platform 1, due to tension in the auxiliary mooring lines, are not significant, and hence do not affect the performance of the device.

While the device has been described above as a means of producing electricity, the hydraulic motor 9 can also be coupled mechanically to drive any other rotating machine in addition to the electric generator 10 that may be desired.

Figure 8:
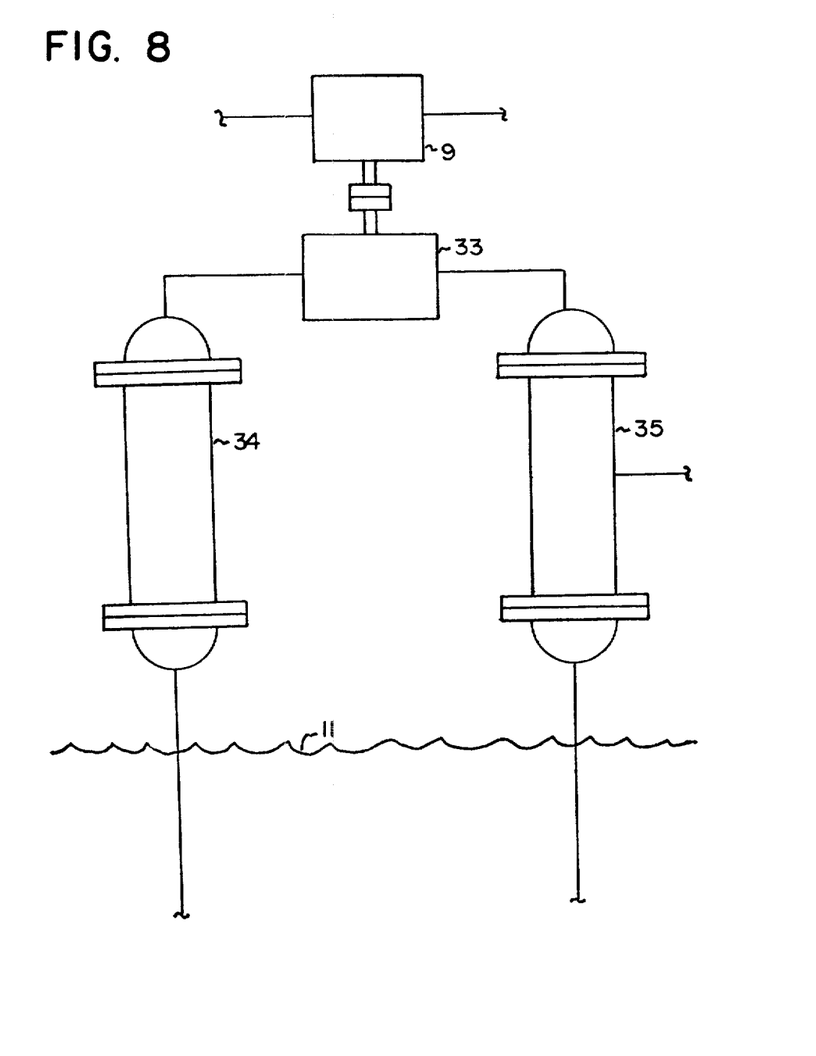
FIG. 8 is a schematic diagram of a reverse osmosis desalination system of the invention, powered by the device of FIG. 1.

According to the present invention, FIG. 8 illustrates schematically how a reverse osmosis desalination system driven by the hydraulic motor 9 can be provided. The system is comprised of a pump 33, which is mechanically coupled to, and driven by, the hydraulic motor or turbine 9, and hydraulically connected to pump salt sea water through a filter system 34 and through a system of known reverse osmosis desalination units 35, where fresh water is extracted and concentrated salt sea water is discharged back into the sea.

Figure 9:
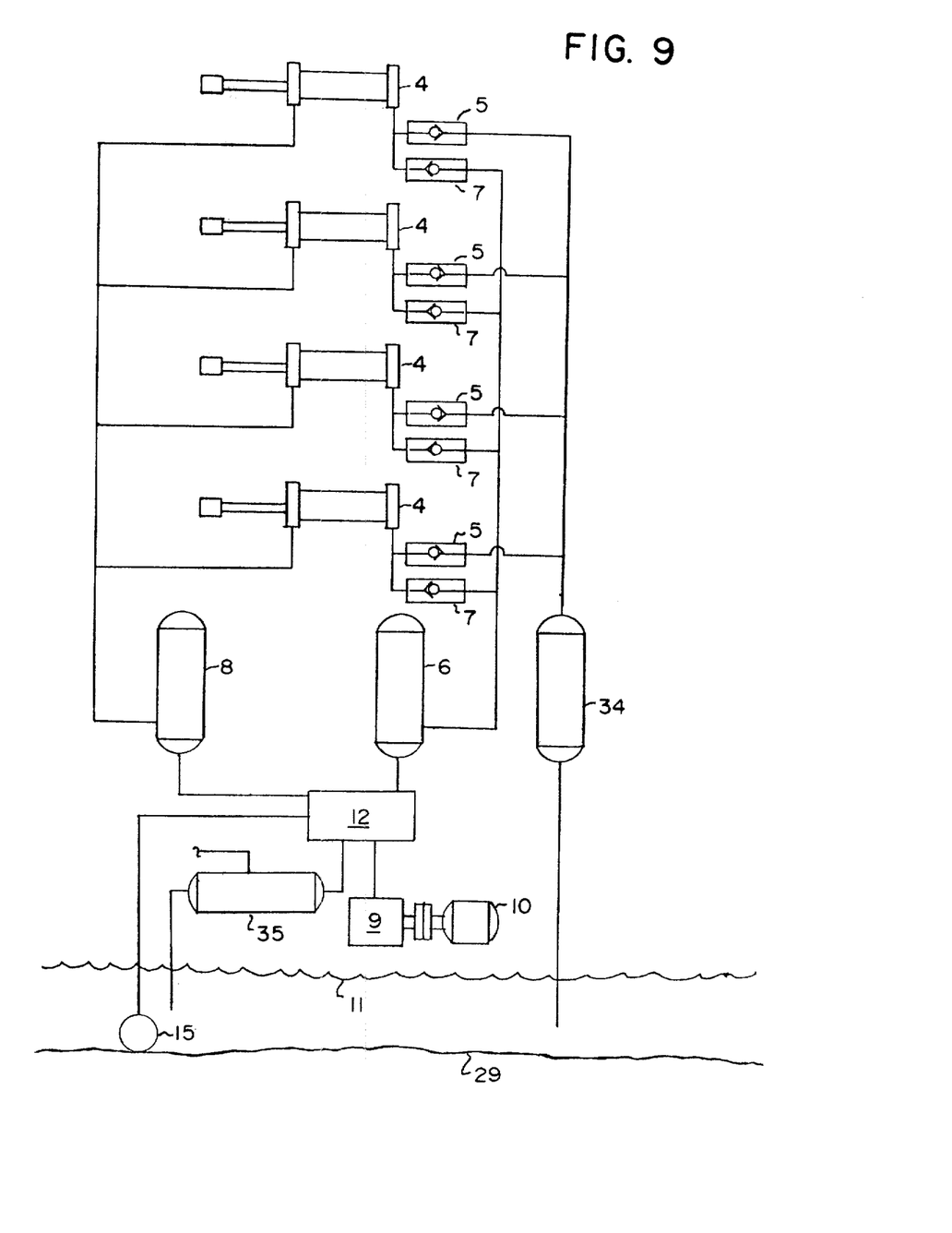
FIG. 9 is a schematic diagram of the device of FIG. 1, converted for desalination of sea water.

An alternative system according to the present invention, which connects the various components of the device in a manner which allows the direct utilization of the pump means for charging sea water to the reverse osmosis desalination system, is illustrated in FIG. 9. In this embodiment, the platform 1, the mooring lines 2, the guide pulleys 3, and the anchoring means are unchanged. The details of the internal portions of the hydraulic cylinders 4 are also unchanged. However, the check valves 5 and 7, the high pressure reservoir 8, the low pressure reservoir 6, the hydraulic motor 9, the controller 12, the sea condition monitor 15, the sea water filter 34 and the reverse osmosis system 35 are interconnected in a different manner.

More specifically, the air-cushioned high pressure reservoir 8 is directly connected to the shaft end of the hydraulic cylinders 4 and acts as a gas spring, always tending to draw the piston shafts back into the cylinders and tighten the mooring lines. The opposite end of each cylinder is connected to a check valve 5 which allows sea water to flow through the filter 34 into the cylinder 4 during piston shaft extension, and to a second check valve 7 which allows sea water to flow to the air-cushioned low pressure reservoir 6 during piston shaft retraction. The controller 12 controls the flow of sea water from the reservoir 6 to the reverse osmosis system 35 and the hydraulic motor 9 and charges sea water into and out of the reservoir 8 by means of a small reversible transfer pump (not shown) so as to regulate the pressures in the two reservoirs 6 and 8 in dependence upon the parameters of the sea as determined by the sea condition monitor 15. The hydraulic motor 9 is used to drive an electric generator 10 as before. The working fluid is filtered sea water.

The principle advantage of this alternative configuration is that a separate pumping means is not needed for supplying sea water to the desalination system. Also, the hydraulic motor 9 need only be large enough to drive the generator 10. These advantages can be significant in the case where the principal use of the device is for sea water desalination, and the electric generator is used only to provide limited power for the various system control devices.

The operation of the device illustrated in drawings 1-8 will now be described. Having located the device in a desirable spot in the sea and made appropriate power transmission connections from the electrical generator 10 to an on shore or other energy using, distributing, storage or handling system, the device will proceed to extract and convert hydrodynamic energy from waves in the following manner. As the crest of a wave approaches the device, the water surface indicated by reference numeral 11 increases its elevation relative to the platform 1 causing an increase in its upward buoyant force. The increased buoyant force is matched by equivalent increases in tension in the mooring lines 2. This increase in tension in turn causes movement of the pistons in their respective hydraulic cylinders 4 and forces hydraulic fluid through the check valves 7 into the high pressure reservoir 8.

As the crest of the wave passes, and the platform begins to settle into the trough of the wave, the slack in the mooring lines is accommodated by the flow of hydraulic fluid from the low pressure reservoir 6, through the check valves 5 and into the hydraulic cylinders 4, causing retraction of the pistons into the respective hydraulic cylinders and tightening of the mooring lines.

Thus, energy is extracted and converted during a half cycle of each wave as the platform rides from trough to crest. The other half cycle is used for resetting the device for the next following half cycle. The hydraulic fluid power represented by the pressure differential and quantity of fluid in the two reservoirs 6, 8 is converted to electrical power by allowing fluid to flow through the hydraulic motor 9 which in turn drives the electrical generator 10.

At the same time, any number of other rotating machines can be driven by the hydraulic motor 9, such as the pump 33 of the desalination system of FIG. 8. In this case, the device provides both electricity and fresh water from the sea at the same time.

The sea condition monitor 15 transmits a signal containing information such as wave height, wave length, wave period and water depth to the intelligent controller 12, which regulates the pressure of the air cushion in the reservoirs 6, 8 so as to achieve optimum power conversion efficiency regardless of varying sea conditions.

Energy conversion efficiency is enhanced if the platform has a length and width similar to the length of the waves, and a mass sufficiently low to produce a natural frequency for vertically directed mechanical oscillation due to the buoyancy of the water which is high compared to the wave propagation frequency.

Figure 4:
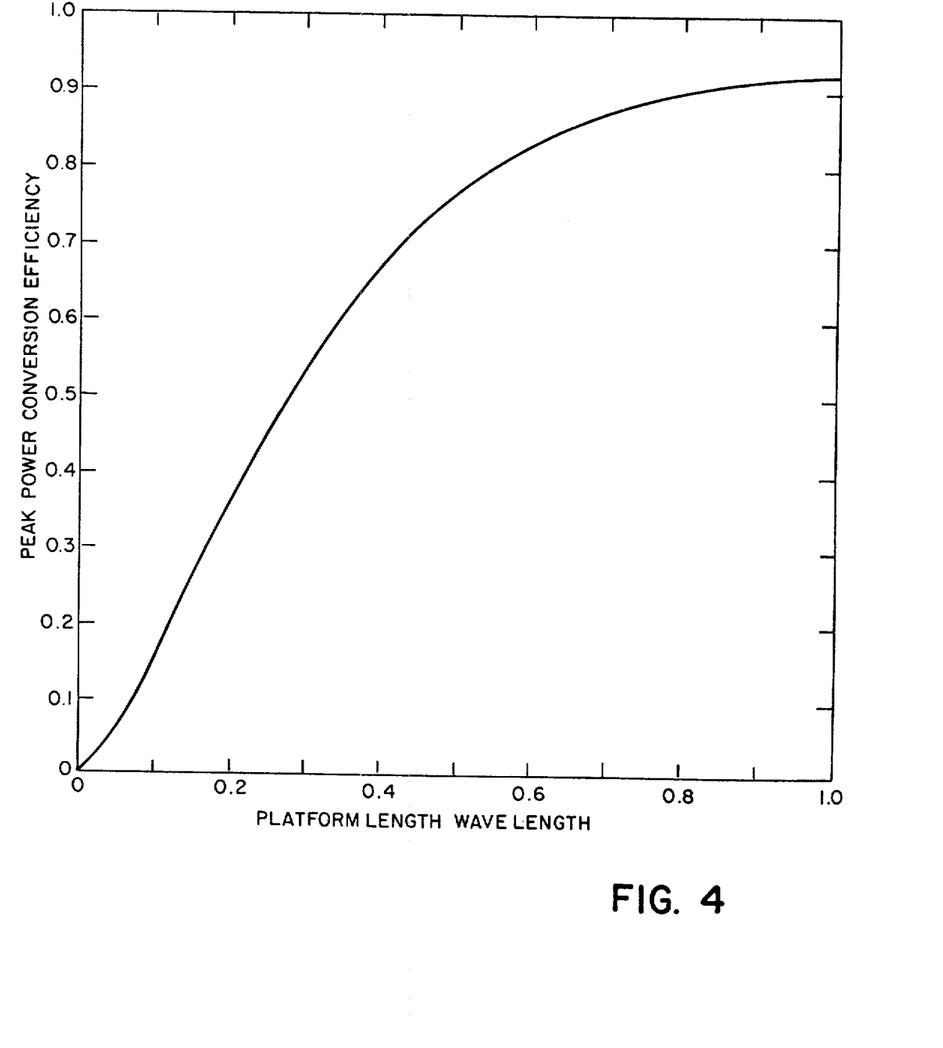
FIG. 4 shows graphically wave energy conversion efficiency against length of a platform of the device of FIG. 1.

While the foregoing efficiency conditions are not necessarily apparent from existing literature, they are well supported by tests that have been conducted by the present inventor. FIG. 4 shows graphically the result of such tests where various platforms of high natural frequency were employed to show the effect of platform length on power conversion efficiency. Other tests have been conducted which show that the optimum hydraulic fluid pressure in the high pressure reservoir 8 for maximum energy conversion efficiency depends upon wave height, wave length and water depth. The device can accommodate changes in water level when sufficiently long hydraulic cylinders 4 are employed.

When the device is employed principally as a desalination machine, the hydraulic circuit configuration of FIG. 9 may be preferred. In this arrangement, the operation of the device is described as follows:

Having located the device in a desirable spot in the sea and made appropriate water line connections to the device for feeding salt water from the sea, fresh water to shore and sea water concentrate back to the sea, the device will proceed to extract and utilize energy from waves in the following manner. As the crest of a wave approaches the device, the water surface indicated by reference numeral 11 increases its elevation relative to the platform 1 causing an increase in its upward buoyant force. The increased buoyant force is matched by equivalent increases in tension in the mooring lines 2. This increase in tension in turn causes movement of the pistons in their respective hydraulic cylinders 4 and forces sea water from the shaft end of the hydraulic cylinders 4 back into the high pressure reservoir 8. At the same time, sea water is drawn through the sea water filter 34 and check valves 5 into the non-shaft ends of the hydraulic cylinders 4.

As the crest of the wave passes, and the platform begins to settle into the trough of the wave, the slack in the mooring lines is accommodated by the flow of sea water back into the shaft end of the hydraulic cylinders 4 from the high pressure reservoir 8 causing retraction of the pistons into the respective hydraulic cylinders, tightening of the mooring lines 2, and the forcing of sea water out of the non-shaft ends of the hydraulic cylinders 4 through check valves 7 and into the low pressure reservoir 6.

Thus, energy is extracted and stored as pressurized sea water in the high pressure accumulator 8 during a half-cycle of each wave as the platform rides from trough to crest. The other half-cycle is used for transferring the extracted energy stored in the high pressure reservoir 8 to the low pressure reservoir 6 as pressurized sea water and for resetting the device for the next following half-cycle.

The sea condition monitor 15 transmits information such as wave height, wave length, wave period and water depth to the intelligent controller 12, which regulates the flow of sea water from the low pressure reservoir 6 through the reverse osmosis system 35 so as to maintain pressures in the two reservoirs 6, 8 that will produce optimum energy conversion efficiency regardless of varying sea conditions. The pressure in the low pressure reservoir 6 is influenced directly by the rate of flow through the reverse osmosis system 35. The pressure in the high pressure reservoir 8 is influenced indirectly by means of the reversible transfer pump included within the controller 12 for transferring fluid between the two reservoirs 6, 8.

Additionally, the controller 12 can regulate the flow of fluid through the hydraulic motor 9 to drive the generator 10 to produce electricity at a preset rate. The electricity can be used to power various control devices and instruments associated with the reverse osmosis system 35, the sea condition monitor 15, and the controller 12.

Two fluid streams are produced by the reverse osmosis unit 35. One is concentrated salt sea water which is returned to the sea. The other is fresh water which is the product produced by the device and can be put to whatever purpose one chooses.

In the event of extremely violet sea conditions, the intelligent controller 12 can instruct a pumping system (not shown) to flood compartments in the platform 1 so as to cause it to sink to the sea bed as a survival means. When the storm has subsided, the controller can instruct the pumping system to drain the flooded compartments and recharge them with air, thereby causing the platform 1 to rise to the water surface and resume normal functioning.

I claim:

1. A device for producing fresh water from salt sea water by utilizing the hydrodynamic energy of waves, comprising:
   a buoyant platform;
   mooring means for mooring the platform at sea;
   pump means mounted on the platform and connected to the mooring means;
   a reservoir for containing pressurized sea water connected to the pump means;
   a reverse osmosis desalination system for extracting fresh water from the sea water connected to the reservoir means;
   hydraulic flow control means for causing the pump means to pump sea water into the sea water reservoir, as motion of the buoyant platform is produced due to the passing of waves beneath it;
   measuring means for measuring parameters of the sea adjacent the buoyant platform; and
   a control device connected to control the pressure in the sea water reservoir and flow of sea water from the reservoir through the desalination system in dependence upon the parameters of the sea determined by the measuring means.

2. A device as claimed in claim 1 in which a hydraulic motor is connected to the sea water reservoir and pressurized sea water is allowed to flow through the motor to produce rotary power.

3. A device as claimed in claims 1 or 2 in which the platform has a length and width of at least 30 meters.

4. A device as claimed in claims 1 or 2 in which the platform has a vertical mode natural frequency due to buoyancy of the water of 0.5 Hz.

5. A device as claimed in claim 2 in which the motor means is mechanically connected to drive an electrical generator.

6. A device as claimed in claim 5 in which the control device determines the relative quantities of fresh water and electricity that are produced.

7. A device as claimed in claim 1 in which the pump means comprises a plurality of piston-and-cylinders, the pistons of which are connected to the mooring means.

8. A device as claimed in claims 1 or 7 in which a gas spring is employed as a means of temporarily storing energy for subsequent use in driving the sea water pumping means.

9. A device as claimed in claim 7 including hydrostatic bearing means acting between cylinder and the respective piston.

10. A device as claimed in claims 7 or 9 including a polymeric coating on the interior of each cylinder and on the respective piston.

11. A device as claimed in claim 10 in which the polymeric coating includes a matrix of a corrosion-resistant metal.

12. A device as claimed in claim 7 including a flexible linkage between each piston and a piston shaft connected to the mooring means.

13. A device as claimed in claim 1 in which the mooring means includes an anchor plate having means to reduce or prevent horizontal movement thereof on the sea bed.

14. A device as claimed in claim 13 in which the mooring means comprises a plurality of symmetrically arranged mooring lines, the lines being closer together on the anchor plate than on the platform.

15. A device as claimed in claims 13 or 14 including piles for locating the anchor plate on the sea bed.

16. A device as claimed in claims 13 or 14 in which there is a concentration of mass around the periphery of the anchor plate.

17. A device as claimed in claims 13 or 16 including an upstanding wall around the anchor plate for containing ballast placed on the anchor plate.

18. A device as claimed in claim 1 in which the platform is hollow.

19. A device as claimed in claim 1 in which the platform is filled with a buoyant material.

20. A device as claimed in claim 1 in which the control device is a minicomputer or microprocessor.

* * * * *